Nov. 11, 1941.   A. L. A. ANDERSON   2,262,265
INTERNAL COMBUSTION ENGINE
Filed April 3, 1941   2 Sheets-Sheet 1
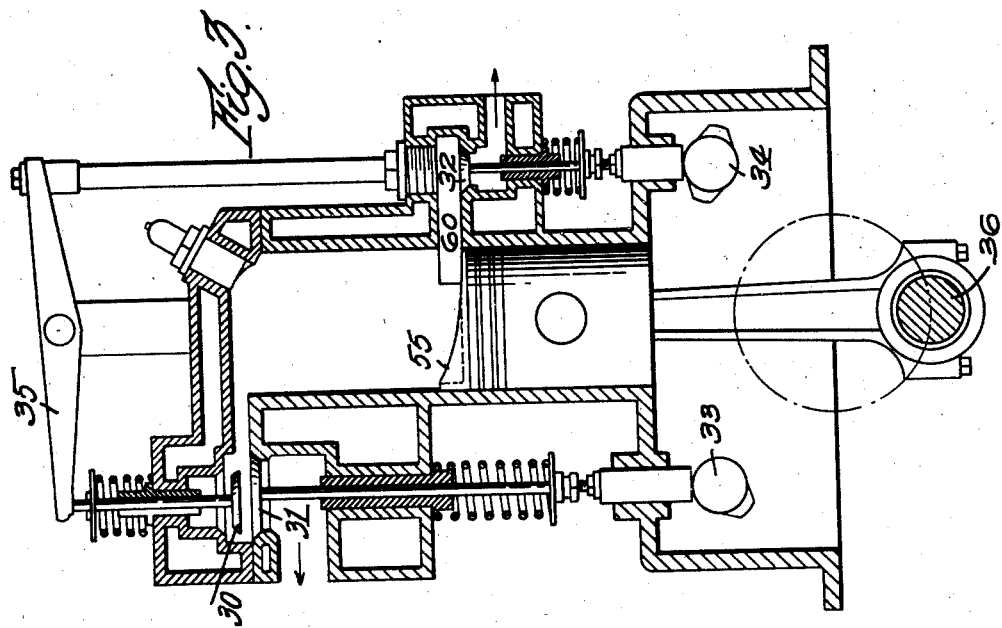
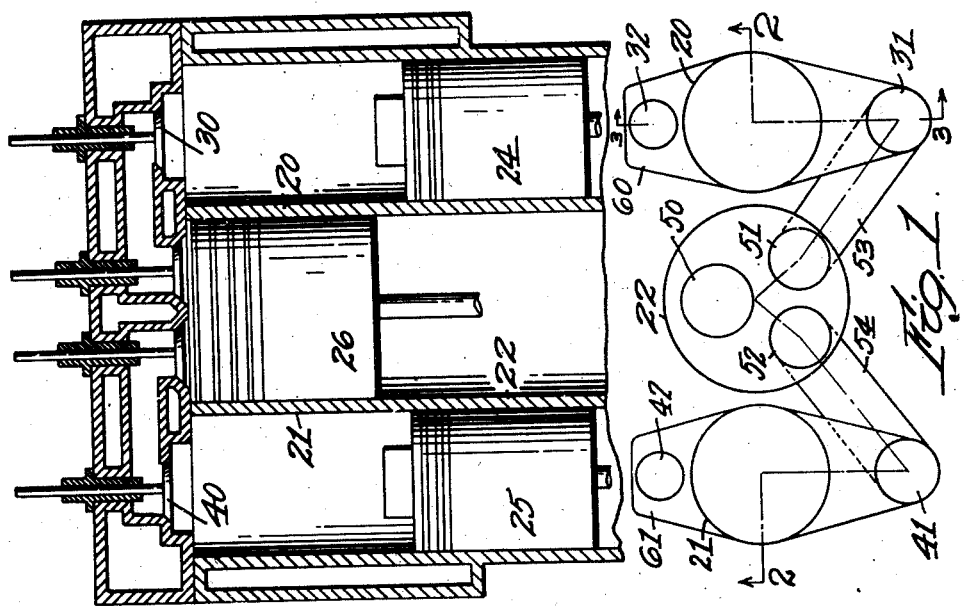
Inventor
Algot L. A. Anderson
By attorney
Chas. T. Hawley

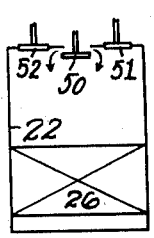 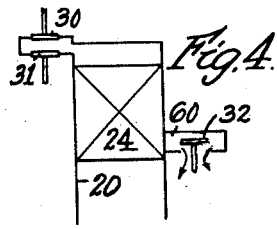 Fig.4. 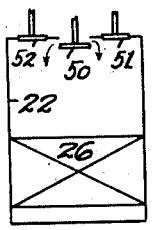 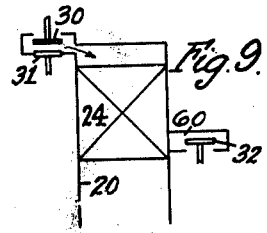 Fig.9.
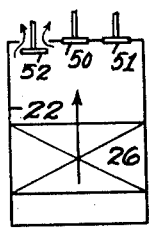 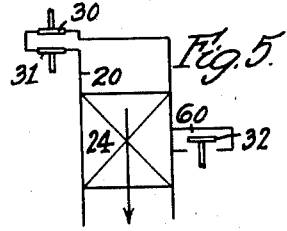 Fig.5. 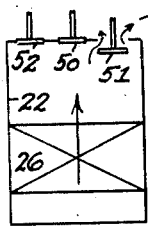 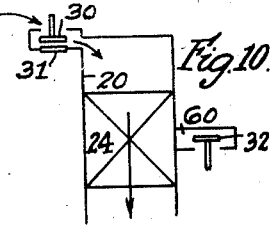 Fig.10.
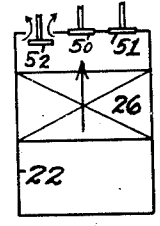 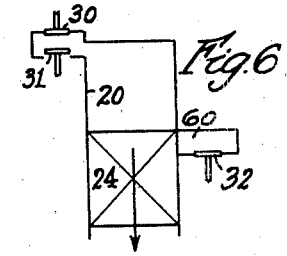 Fig.6. 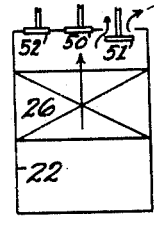 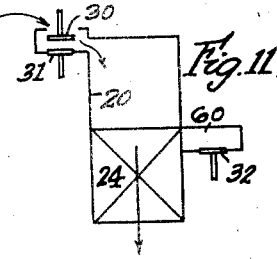 Fig.11.
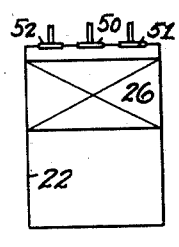 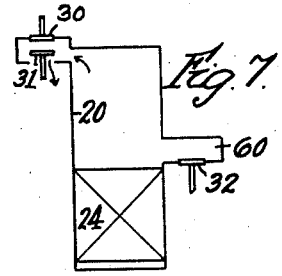 Fig.7. 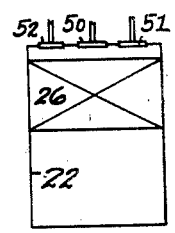 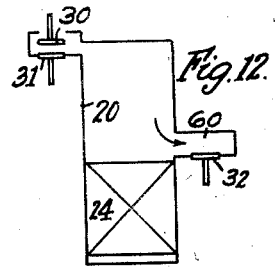 Fig.12.
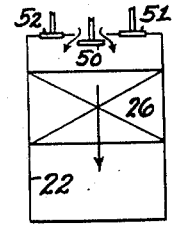 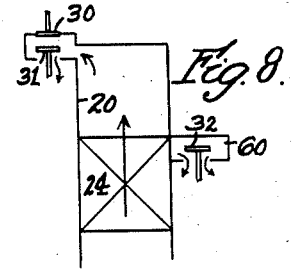 Fig.8. 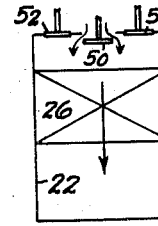 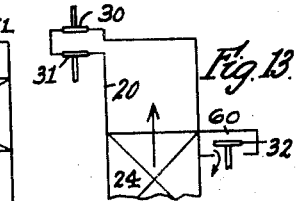 Fig.13.
Inventor.
Algot L. A. Anderson.

Patented Nov. 11, 1941

2,262,265

UNITED STATES PATENT OFFICE 2,262,265

INTERNAL COMBUSTION ENGINE

Algot L. A. Anderson, Worcester, Mass.

Application April 3, 1941, Serial No. 386,602

5 Claims. (Cl. 123—75)

This invention relates to internal combustion engines operating on a four-stroke cycle.

More specifically, the invention relates to an internal combustion engine in which a charging or pump cylinder is provided for each pair of power cylinders.

It is the general object of my invention to improve the construction of such engines as heretofore known by providing an auxiliary exhaust chamber and a supplementary exhaust valve for each power cylinder, said chamber being adapted to receive and thereafter discharge a substantial part of the inert exhaust gas left in the power cylinder and connections when the exhaust stroke is finished.

I also provide an improved cycle of operation, such that a single pump cylinder will alternately supply two power cylinders with a gaseous fuel mixture under pressure.

My invention further relates to arrangements and combinations of parts which will be hereinafter described and more particularly pointed out in the appended claims.

A preferred form of the invention is shown in the drawings, in which

Fig. 1 is a diagrammatic plan view of my improved engine;

Fig. 2 is a conventionalized sectional elevation of the engine, taken substantially along the irregular line 2—2 in Fig. 1;

Fig. 3 is a sectional side elevation, taken along the line 3—3 in Fig. 1; and

Figs. 4 to 13 are diagrammatic views, showing piston and valve positions at a series of successive points in the engine cycle.

Referring to Figs. 1 to 3, my improved engine, as shown herein, comprises power cylinders 20 and 21 and a pump or charging cylinder 22. These three cylinders are provided with pistons 24, 25 and 26 respectively. The cylinder 20 has an intake valve 30, a regular exhaust valve 31 and a supplementary exhaust valve 32, all of said valves being operated from cam shafts 33 and 34, either directly or through a rocker arm 35.

The intake valve 30 and regular exhaust valve 31 are opened and closed once for each two revolutions of the crankshaft 36, while the supplementary exhaust valve 32 is opened and closed twice for each two revolutions of the crankshaft.

The cylinder 21 is correspondingly provided with an intake valve 40 (Fig. 2), a regular exhaust valve 41 and a supplementary exhaust valve 42, all constructed and operated as previously described.

The pump cylinder 22 is provided with an intake valve 50 and two charging valves 51 and 52. The charging valve 51 is connected by a passage 53 to the intake valve 30 of the power cylinder 20, and the charging valve 52 is similarly connected by a passage 54 to the intake valve 40 of the cylinder 21.

The pistons are provided with the usual packing rings, and the power pistons may be shielded as indicated at 55. The usual springs are provided for seating the several valves above described.

The cranks on the crankshaft 36 are so disposed that the power pistons 24 and 25 move in the same direction and at the same time but in different parts of the operating cycle, while the pump piston 26 moves at all times in a direction opposite to that of the pistons 24 and 25 of the power cylinders.

The supplementary exhaust valves 32 and 42 are located in auxiliary exhaust chambers 60 and 61, which are commonly of not greater capacity than the compression spaces of the cylinders 20 and 21 when the pistons are at top center respectively.

Having described the construction of my improved engine, I will now describe the operation thereof with special reference to the diagrams shown in Figs. 4 to 13. These diagrams indicate the positions of the pump piston 26 and its associated valves 50, 51 and 52, and also the positions of the power piston 24 in the cylinder 20 and the positions of the valves 30, 31 and 32 associated therewith, at successive points in the operating cycle.

The second power cylinder 21 and associated piston and valves are omitted to simplify the diagrams, as a description of the operation of one power cylinder and associated parts applies identically to the other cylinder, except that all of the various functions are performed just one crankshaft revolution later.

The parts are indicated in Fig. 4 at top center for the power piston 24 and with the power stroke about to begin. The pump piston 26 has just completed its down or charging stroke, and the cylinder 22 is filled with fresh fuel mixture. The intake valve 30 and the exhaust valve 31 are both closed, and the auxiliary valve chamber 60 is shut off from the cylinder 20 by the piston 24. The supplementary exhaust valve 32 is open to allow exhaust gases to escape from the chamber 60, as will be hereinafter described.

Fig. 5 shows the power piston 24 moving downward in its power stroke and displaced to an intermediate point in said stroke, and the pump piston 26 at a corresponding point in its up stroke. The intake valve 50 for the pump cylinder has been closed and the charging valve 52 has been opened to supply fuel mixture to the power cylinder 21, not shown in the diagram. The other valves remain as in Fig. 4.

In Fig. 6, the parts are shown near the end of the power stroke, with the piston 24 approaching bottom center and the piston 26 similarly approaching top center. The supplementary exhaust valve 32 is now closed and the regular exhaust valve 31 has started to open.

In Fig. 7, the power piston 24 is at bottom center and about to move upward on the exhaust stroke. The valve 31 is fully open and the valves 30 and 32 remain closed. The auxiliary exhaust chamber 60 is open to the cylinder 20 and receives a part of the exhaust gases.

Fig. 8 shows the power piston 24 moved upward far enough to shut off the auxiliary exhaust chamber 60, and also shows the supplementary exhaust valve 32 open to discharge the exhaust gases from said chamber. The pump piston 26 has been moved downward and the intake valve 50 is open to charge the pump cylinder 22 with fuel mixture. The exhaust valve 31 remains open and the intake valve 30 remains closed.

Fig. 9 shows the power piston 24 at top center and about to begin its downward intake stroke, with the intake valve 30 opening and the exhaust valve 31 closed. The valves in the pump cylinder 22 and in the auxiliary exhaust chamber remain as in Fig. 8.

Fig. 10 shows the power piston 24 displaced downward to an intermediate position on the intake stroke, the intake valve 30 fully open, the intake valve 50 of the pump cylinder closed, and the charging valve 51 open to supply fuel mixture to the cylinder 20.

Fig. 11 shows the power piston 24 approaching bottom center and about to uncover the opening to the auxiliary exhaust chamber 60, the supplementary exhaust valve 32 being now closed. All other valves remain as in Fig. 10.

In Fig. 12, the power piston 24 is at bottom center and about to begin its upward compression stroke. The charging valve 51 is closed but the intake valve 30 is still open. The pressure of the fuel mixture in the cylinder 20 forces a substantial part of the inert exhaust gases from said cylinder into the now open auxiliary exhaust chamber 60.

In Fig. 13, the power piston 24 has moved upward and closed off the opening to the chamber 60, the supplementary exhaust valve 32 has opened, the intake valve 30 has closed, and the fresh charge of fuel mixture is being compressed in the upper part of the cylinder 20. The pump piston 26 is again moving downward and the intake valve 50 is open, so that the cylinder 22 will be again charged with fuel mixture.

As upward movement of the power piston 24 is completed, the parts are again in the relative positions shown in Fig. 4, with the next power stroke about to begin.

It is believed unnecessary to specifically describe the corresponding operations for the associated cylinder 21, as the operations are identical, except that the intake for the cylinder 21 occurs during the power stroke of the piston 24, the compression in the cylinder 21 occurs during the exhaust in the cylinder 20, and the power stroke for the cylinder 21 occurs during intake for the cylinder 20.

The addition of the auxiliary exhaust chambers 60 and 61 and the supplementary exhaust valves 32 and 42 is of very substantial importance, as a large part of the inert exhaust gases remaining in the power cylinders when the exhaust valves are closed are forced into these auxiliary exhaust chambers by the next inrushing fuel charges, after which the auxiliary chambers are shut off and the supplementary exhaust valves are opened to permit these additional exhaust gases to escape. Consequently, the fuel charges are much less diluted by inert gases and the power of the engine is correspondingly increased.

While I have described the pump cylinder and piston as supplying a fuel mixture for the power cylinders, the pump cylinders may supply air only, while the fuel is injected direct to the power cylinders, either method of fuel supply being common practice in the art.

Having thus described my invention and the advantages thereof, I do not wish to be limited to the details herein disclosed, otherwise than as set forth in the claims, but what I claim is:

1. In an internal combustion engine operating on a four-stroke cycle, in combination, a power cylinder and piston, a pump cylinder and piston, intake and charging valves for said pump cylinder, intake and exhaust valves for said power cylinder, an auxiliary exhaust chamber for said power cylinder, a supplemental exhaust valve for said exhaust chamber, and means to open and close said valves, said exhaust chamber being uncovered by said power piston to receive residual exhaust gases from said power cylinder as said cylinder receives a fuel charge on the intake stroke and said exhaust chamber being closed as the power piston rises on the compression stroke, and said exhaust valve being thereafter opened to vent said exhaust chamber and being again closed before said chamber is again uncovered by said piston at the end of the power stroke.

2. In an internal combustion engine as defined in claim 1, the feature that the auxiliary exhaust chamber is not larger than the compression space above the associated power piston at top center.

3. In an internal combustion engine operating on a four-stroke cycle and having a power cylinder and piston, a pump cylinder and piston, intake and charging valves for said pump cylinder and intake and exhaust valves for said power cylinder, and means to open and close said valves, that improvement which comprises an auxiliary exhaust chamber for said power cylinder, a supplemental exhaust valve for said exhaust chamber, and actuating means for said exhaust valve, said exhaust chamber being uncovered by said power piston to receive residual exhaust gases from said power cylinder as said cylinder receives a fuel charge on the intake stroke and said exhaust chamber being closed as the power piston rises on the compression stroke, and said exhaust valve being thereafter opened to vent said exhaust chamber and being again closed before said chamber is again uncovered by said piston at the end of the power stroke.

4. In an internal combustion engine as defined in claim 3, the feature that the compression space above the associated power piston at top center is at least as large as the auxiliary exhaust chamber.

5. In an internal combustion engine operating on a four-stroke cycle and having a power cylinder and piston, a pump cylinder and piston, intake and charging valves for said pump cylinder and intake and exhaust valves for said power cylinder, and means to open and close said valves, that improvement which comprises an auxiliary exhaust chamber for said power cylinder, a supplemental exhaust valve for said exhaust chamber, and actuating means for said exhaust valve, said exhaust chamber having an opening into said power cylinder which is uncovered when the power piston is near the lower end of each down stroke, and said actuating means opening said exhaust valve for gas discharge during each up stroke of said piston and closing said valve before said opening is again uncovered.

ALGOT L. A. ANDERSON.